(12) United States Patent
Brunner

(10) Patent No.: US 6,350,485 B2
(45) Date of Patent: *Feb. 26, 2002

(54) METHODS AND COMPOSITIONS FOR ENHANCING PALATABILITY OF PET FOOD

(75) Inventor: John J. Brunner, Kirkwood, MO (US)

(73) Assignee: Ralston Purina Company, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/767,982

(22) Filed: Jan. 23, 2001

Related U.S. Application Data

(63) Continuation of application No. 09/428,631, filed on Oct. 27, 1999, now Pat. No. 6,254,920.
(60) Provisional application No. 60/109,686, filed on Nov. 24, 1998.
(51) Int. Cl.[7] .............................. A23D 2/02; A23K 1/18
(52) U.S. Cl. ....................... 426/656; 426/657; 426/658; 426/641; 426/302; 426/805; 426/549
(58) Field of Search ................................ 426/302, 656, 426/641, 805, 658, 657, 549

(56) References Cited

U.S. PATENT DOCUMENTS

| 4,678,662 A | * | 7/1987 | Chan | 424/57 |
| 5,000,940 A | * | 3/1991 | Staples et al. | 424/49 |
| 5,186,964 A | * | 2/1993 | Gierhart et al. | 426/74 |
| 5,532,010 A | * | 7/1996 | Spanier et al. | 426/94 |

FOREIGN PATENT DOCUMENTS

JP 59001409 * 1/1984

OTHER PUBLICATIONS

Salahuddin et al., Indian J. Poultry Sci., vol. 26(1) pp. 39–43, 1991.*

* cited by examiner

Primary Examiner—Chhaya D. Sayala
(74) Attorney, Agent, or Firm—Armstrong Teasdale LLP

(57) ABSTRACT

Compositions and methods for enhancing the palatability of dry and semi-dry pet food compositions, particularly extruded cat food compositions, are described. In one embodiment, the palatability enhancer is a dry cat food coating including tetrasodium pyrophosphate at about 0.1% to about 1.0% by weight of the finished pet food product. The palatability enhancer is applied after the extrusion process to the extruded particles or pieces of pet food.

24 Claims, No Drawings

METHODS AND COMPOSITIONS FOR ENHANCING PALATABILITY OF PET FOOD

CROSS REFERENCE TO RELATED APPLICATIONS

This patent application is a Continuation of U.S. patent application Ser. No. 09/428,631, filed Oct. 27, 1999, now U.S. Pat. No. 6,254,920 B1, issued Jul. 3, 2001, which claims the priority of Provisional U.S. Patent Application Ser. No. 60/109,686, filed Nov. 24, 1998.

FIELD OF THE INVENTION

This invention relates generally to methods and compositions for enhancing the palatability of pet foods, and more particularly to compositions and methods for enhancing the palatability of dry and semi-dry cat food.

BACKGROUND OF THE INVENTION

Pet food manufacturers have a long-standing desire to provide foods which combine high nutritional value, and resistance to decomposition and bacterial contamination, with low production costs. In addition, and with particular regard to cat foods, pet food manufacturers desire a high degree of palatability which can be attained at low cost.

The three main types of pet foods embody the desired characteristics to varying degrees. Canned or high-moisture (greater than 50% moisture) foods are typically all meat and therefore generally highly palatable to animals. However, such foods are typically costly to produce and package, require the use of preservatives to inhibit decomposition and contamination, and are relatively less nutritious per unit weight than other pet food products. Dry or low-moisture content pet foods (less than 15% moisture) are generally highly nutritious, may be inexpensively packaged, and are highly convenient to store and use. However, dry or low-moisture foods are generally the least palatable of pet foods. Semi-dry or intermediate moisture content pet foods (about 15% to about 50% moisture) are generally more palatable than dry foods, have higher nutritional value, and are more inexpensively packaged and more conveniently used than high moisture foods. However, intermediate moisture content foods may be more susceptible to bacterial contamination than dry pet foods, and are generally less palatable than high moisture content foods.

Dry and semi-dry foods are generally preferred by manufacturers and pet owners alike because such foods are more convenient to store and use, and because of the higher nutritional content than high-moisture pet foods. However, many animals, and particularly cats, are picky eaters desiring a high degree of palatability. There remains a need for a low-moisture pet food with a high degree of palatability.

Known palatability enhancers for low moisture pet foods include various surface coating compositions. For example, known palatability enhancers include surface coatings of phosphoric acid; a combination of fat with hexamic, phosphoric or citric acid; and a mixture of phosphoric acid and citric acid. Palatability may also be enhanced by the application of liquid or dry flavorings as a coating. Liquid or dry animal digest coatings are widely used to enhance palatability, and animal digest is also used in a liquid combination with phosphoric acid. Dry animal digest may be used in a two step coating process with liquid phosphoric acid. Dry application of sodium acid phosphate, which may be used in combination with animal digest, is also known.

However, the known compositions and methods remain limited in the resulting degree of palatability. It would be desirable to provide a composition and method for further enhancing the palatability of dry and semi-dry pet foods. It would also be desirable to provide such a composition with a high degree of palatability for cats. It would be further desirable to provide such a composition and method which enhances dry and semi-dry pet food palatability at a relatively low production cost. It would be still further desirable to provide such a palatability enhancer which is robust among different formulations.

SUMMARY OF THE INVENTION

These and other objects may be attained by a pet food palatability enhancer which includes tetrasodium pyrophosphate. The palatability enhancer, and methods for enhancing the palatability of pet foods, generally relate to dry and semi-dry pet foods including a nutritionally balanced mixture of proteinaceous and farinaceous materials. Generally, the palatability enhancer is a dry formulation including from about 0.1% up to about 99% by weight tetrasodium pyrophosphate. In one embodiment, the palatability enhancer is formulated by adding tetrasodium pyrophosphate in dry powdered form to a dry composition for application to a dry pet food. The dry composition typically also includes readily commercially available ingredients such as dried whey, dried animal digest, and yeast. The amount of tetrasodium pyrophosphate added to the dry composition is adjusted so that tetrasodium pyrophosphate contributes about 0.1% to about 1.0% by weight of the finished dry pet food.

In use and in one embodiment, the palatability enhancer is applied to particles or pieces of extruded, dry or semi-dry cat food. More specifically, the particles or pieces are added to a coating drum and molten animal fat and other liquids are sprayed over the dry pieces. The palatability enhancer is applied to the pieces and the pieces are tumbled in the drum to thoroughly coat the pieces.

The palatability enhancer improves the palatability of dry and semi-dry pet foods. The palatability enhancer is particularly effective for enhancing the palatability to cats of dry and semi-dry cat foods. Further, the palatability enhancer may be added to commercially available dry and semi-dry cat foods or other pet and animal foods at a relatively low production cost.

DETAILED DESCRIPTION

The palatability enhancer generally is a dry composition including from about 0.1% up to about 99% by weight tetrasodium pyrophosphate. The palatability enhancer is generally externally applied, using dry application methods, to commercially available, dry or semi-dry pet foods.

More specifically, the palatability enhancer and methods for enhancing the palatability of dry and semi-dry pet foods, generally relate to a nutritionally balanced mixture of proteinaceous and farinaceous materials having a moisture content of about 50% or less by weight. Such mixtures are known as dry or semi-dry pet foods to those skilled in the art, and the palatability enhancer is applied to pieces of the dry or semi-dry food. The pet food compositions described herein are not intended to be limited to a specific listing of ingredients because such ingredients will depend on such factors as, for example, the desired nutritional balance for the specific type of pet, and availability of ingredients to the manufacturer. In addition to the proteinaceous and farinaceous materials, the pet food composition generally may include vitamins, minerals, and other additives such as flavorings, preservatives, emulsifiers and humectants. The nutritional balance, including the relative proportions of vitamins, minerals, fat, protein and carbohydrate, is determined according to dietary standards known in the veterinary art. For example, the nutritional balance of a cat food composition is determined according to the known dietary requirements for cats.

The proteinaceous material may include any material having a protein content of at least about 15% by weight including vegetable proteins such as soybean, cotton seed, and peanut; animal proteins such as casein, albumin, and fresh animal tissue including fresh meat tissue and fresh fish tissue; and dried or rendered meals such as fish meal, poultry meal, meat meal, bone meal and the like. Other types of suitable proteinaceous materials include wheat gluten or corn gluten, and microbial proteins such as yeast.

The farinaceous material may be defined as any material having a protein content of less than about 15% by weight and containing a substantial proportion of starches or carbohydrates, including grains such as corn, milo, alfalfa, wheat, barley, rice, soy hulls, and other grains having low protein content. In addition to the proteinaceous and farinaceous materials, other materials such as whey and other dairy by-products, as well as other carbohydrates may be added. In addition, known flavorings including, for example, corn syrup or molasses, may be added.

In one exemplary embodiment, the palatability enhancer is applied to a dry cat food composition. Generally, the term cat food composition as used herein applies to commercially sold, nutritionally balanced food compositions which are intended to provide substantially the sole diet for a cat. Thus, such compositions may be described as having a minimum protein content at which cat health is maintained. However, the minimum protein content of the food varies according to the age and breeding status for the animal. For example, a nutritionally balanced cat food composition for breeding females and kittens requires a minimum protein content of at least about 28% by weight on a dry matter basis. A nutritionally balanced cat food composition for non-breeding and adult cats requires a minimum protein content of about 26% by weight on a dry matter basis. More typically, the protein content of commercially available cat food compositions for adult, non-breeding cats is about 30% by weight on a dry matter basis, to insure that the food meets the nutritional requirements of any cat.

For example, a typical formula well known in the art for a dry cat food composition to which the palatability enhancer is applied is as follows (in percent by weight): about 0–70% grain-based meal or flour, such as corn, wheat, barley or rice; about 0–30% animal by-product meal, such as poultry or beef meal; about 0–25% corn gluten meal; about 0–25% fresh animal tissue, such as poultry or beef tissue; about 0–25% soybean meal or flour; about 0–10% animal fat; about 0–20% seafood-based meal; about 0–25% fresh fish tissue; about 0–10% high fructose corn syrup; about 0–10% dried molasses; about 0–1.5% phosphoric acid; and about 0–1.5% citric acid. Vitamins and minerals are added according to known American Association of Feed Control Officials (AAFCO) Cat Food Nutrient profiles, and include calcium carbonate, potassium chloride, sodium chloride, choline chloride, taurine, zinc oxide, ferrous sulfate, vitamin E, vitamin A, vitamin $B_{12}$, vitamin $D_3$, riboflavin, niacin, calcium pantothenate, biotin, thiamine mononitrate, copper sulfate, folic acid, pyroxidine below. The tetrasodium pyrophosphate, and other dry ingredients as desired, are added to the slurry prior to application. A liquid formulation of the palatability enhancer includes about 5–45 weight % tetrasodium pyrophosphate; about 1–50 weight % animal tissue such as beef hearts or livers, or chicken hearts or livers; about 0.1–3.0 weight % amino acid such as alanine or lysine; about 0.1–1.0 weight % preservatives such as sorbic acid and about 0.1–2.0 weight % enzymes such as protease. For example, one embodiment of the liquid formulation includes about 14–20 weight % tetrasodium pyrophosphate.

In use, the palatability enhancer is applied to the particles or pieces of dry or semi-dry pet food such as, for example, dry extruded kibbles as known in the art. The palatability enhancer is applied, for example, by spraying or dusting onto the particles or pieces of the food. More specifically, to make a cat food composition to which the palatability enhancer is applied, proteinaceous and farinaceous materials and additional desired materials as described above are combined to form an admixture and are well blended. The admixture is then transferred to a steam conditioner and subjected to steam and moisture to adjust the moisture content of the admixture to between about 20% and 40% by weight. The conditioned admixture is then cooked under conditions of elevated temperature and pressure in an extruder such as a single screw extruder. The extruder may include a die having a particular shape, such as a fish, cross or circle. The product is segmented into discrete particles or pieces by a rotating cutting knife as the product is extruded.

The particles or pieces are conveyed to a forced air drying system which raises the temperature of the pieces to about 140° F., and reduces the moisture level to about 8% by weight. The dried particles or pieces are then transferred by bulk conveyor to a coating drum and sprayed with animal fat. Other liquids such as, for example, citric acid or phosphoric acid may alternatively be applied to the pieces, or applied in addition to the animal fat. The pieces are then sprayed or dusted with the palatability enhancer, and tumbled to thoroughly coat hydrochloride, calcium iodate, and menadione sodium bisulfite complex (a source of vitamin K activity).

In addition, the palatability enhancer relates to other pet foods and animal foods in general without regard to the protein content which typically varies according to species, breeding status, and age, among other factors. For example, the palatability enhancer may be used with a dry or semi-dry dog food composition for non-breeding, adult dogs, which requires a minimum protein content of about 18% by weight on a dry matter basis. Similarly, the palatability enhancer may be applied to a dry or semi-dry puppy food having a minimum protein content of about 22% by weight on a dry matter basis. The palatability enhancer may also be used with other dry and semi-dry foods of varying protein content, and with foods for other animals such as livestock and research animals.

The palatability enhancer generally includes tetrasodium pyrophosphate and is formulated as a dry mixture in powdered, granulated or encapsulated form. Tetrasodium pyrophosphate is available in dry, powdered form from, for example, Solutia of St. Louis, Mo., and is combined with other dry ingredients including known palatability enhancing ingredients and preservatives. For example, other suitable ingredients for the palatability enhancer include various nucleotides such as inosine monophosphate (IMP), guanosine triphosphate (GTP) and adenosine triphosphate (ATP); amino acids such as alanine and lysine; other inorganic salts such as NaCl, monosodium phosphate, and dicalcium phosphate; and organic materials such as whey, yeast and animal by-products digest. The palatability enhancer includes about 0.1% up to about 99% by weight tetrasodium pyrophosphate. In one embodiment, the amount of tetrasodium pyrophosphate is adjusted so that tetrasodium pyrophosphate contributes about 0.1% to about 1.0% by weight to the finished pet food, depending on the relative amount of the palatability enhancer added to the finished pet food. Generally, the palatability enhancer contributes from about 0.5% to about 3.0% by weight to the finished cat food product. However, both the exact proportion of tetrasodium pyrophosphate in the palatability enhancer, as well as the relative proportion of the palatability enhancer to the finished cat food product, may be varied and are limited by such factors as relative availability of the ingredients, cost, and health of the animal. In addition, the palatability enhancer described herein is not intended to be limited to a specific listing of ingredients because such ingredients will similarly depend on availability and cost of ingredients to the manufacturer.

To make a dry formulation of the palatability enhancer, for example, commercially available dry ingredients, including tetrasodium pyrophosphate, various nucleotides, amino acids, inorganic salts and organic materials are combined in the desired proportions in a batch mixer and blended to homogeneity. In one embodiment, a dry formulation of the palatability enhancer typically includes about 15–25 weight % tetrasodium pyrophosphate, about 0.1–3.0 weight % amino acid, about 35–50 weight % animal by-products such as dried animal digest, and about 35–50 weight % microbial protein such as brewer's yeast. For example, in one embodiment the palatability enhancer includes about 18 weight % tetrasodium pyrophosphate or, in another embodiment, about 25 weight % tetrasodium pyrophosphate. In one specific exemplary embodiment, the palatability enhancer includes about 39.7 weight % dried brewer's yeast, about 39.7 weight % dried chicken liver, about 19.8% tetrasodium pyrophosphate, and about 0.8 weight % L-alanine.

To make a liquid formulation of the palatability enhancer, for example, commercially available liquid ingredients are combined in a mixer. Wet ingredients such as animal tissue are ground or emulsified to a slurry and the liquid ingredients are combined with the slurry. A commercially available protease is added to the slurry to hydrolyze the proteins, and later inactivated with heat, acid or another method. Preservatives such as sorbates are also added to the slurry. Water is added to adjust the viscosity and the solids content of the slurry to between about 10% and 50% to facilitate the application process as described the pieces with the palatability enhancer. The pieces are then cooled to ambient temperature and packaged.

The palatability enhancer with tetrasodium pyrophosphate, in both liquid and dry formulations, was tested against known dry cat food coatings. In both formulations, the palatability enhancer was shown to improve palatability over that obtained with known palatability enhancers.

In four separate tests described in Examples 1 through 4, eighteen adult cats were each offered a control ration R1, and a test ration R2 in a two bowl test over a period of two days. R1 consisted of dry cat food kibbles of Meow Mix® basal formula, commercially available from Ralston Purina Company, Checkerboard Square, St. Louis, Mo., 63164, with 2.25% by weight of a typical dry cat coating containing about 0.1–3.0 weight % amino acid, about 35–50 weight % animal by-products such as dried animal digest, and about 35–50 weight % brewer's yeast. R2 was Meow Mix® basal formula kibbles coated with 2.5% by weight of a dry cat coating which also included 0.5% by weight tetrasodium pyrophosphate.

EXAMPLE 1

Of all food consumed over the two days, R2 represented 84.6% of the total, while R1 represented 15.4%, and the ratio of the amount of R2 consumed to the amount of R1 consumed was 5.5. The animals ate 55.3 grams/day/cat of R2, compared with 11.0 grams/day/cat of R1. All eighteen cats preferred R2 over R1.

EXAMPLE 2

Of all food consumed over the two days, R2 represented 82.7% of the total, while R1 represented 17.3%, and the ratio of the amount of R2 consumed to the amount of R1 consumed was 4.8. The animals ate 58.0 grams/day/cat of R2, compared with 12.0 grams/day/cat of R1. Seventeen cats preferred R2 over R1, while one cat showed no preference.

EXAMPLE 3

Of all food consumed over the two days, R2 represented 85.4% of the total, while R1 represented 14.6%, and the ratio of the amount of R2 consumed to the amount of R1 consumed was 5.9. The animals ate 54.4 grams/day/cat of R2, compared with 8.7 grams/day/cat of R1. Sixteen cats preferred R2 over R1, while one cat showed no preference, and one cat was eliminated for insignificant consumption.

EXAMPLE 4

Of all food consumed over the two days, R2 represented 77.6% of the total, while R1 represented 22.4%, and the ratio of the amount of R2 consumed to the amount of R1 consumed was 3.5. The animals ate 49.2 grams/day/cat of R2, compared with 14.7 grams/day/cat of R1. Sixteen cats preferred R2 over R1, while one cat preferred R1 over R2 and one cat showed no preference.

Table 1 summarizes the results of Examples 1 through 4.

TABLE 1

| Ex. | Ration | most consumed/ least consumed | % of all food consumed | Grams eaten/ day/cat | # of animals with pref. | # of animals without pref. |
|---|---|---|---|---|---|---|
| 1 | R1 | 5.5 | 15.4 | 11.0 | 0 | 0 |
|   | R2 |     | 84.6 | 55.3 | 18 |   |
| 2 | R1 | 4.8 | 17.3 | 12.0 | 0 | 1 |
|   | R2 |     | 82.7 | 58.0 | 17 |   |
| 3 | R1 | 5.9 | 14.6 | 8.7 | 0 | 1 |
|   | R2 |     | 85.4 | 54.4 | 16 |   |
| 4 | R1 | 3.5 | 22.4 | 14.7 | 1 | 1 |
|   | R2 |     | 77.6 | 49.2 | 16 |   |

In two separate tests set forth in Examples 5 and 6, a control ration coated with liquid animal digest was tested against a test ration coated with liquid animal digest including an amount of tetrasodium pyrophosphate.

EXAMPLE 5

Eighteen adult cats were each offered a control ration R1, and a test ration R3 in a two bowl test over a period of two days. R1 consisted of Meow Mix® basal formula kibbles coated with liquid animal digest at 3% by weight. R3 was Meow Mix® basal formula kibbles coated with liquid animal digest at 3% by weight, plus tetrasodium pyrophosphate at 0.75% by weight. Of all food consumed over the two days, R3 represented 69.0% of the total, while R1 represented 31.0%, and the ratio of the amount of R3 consumed to the amount of R1 consumed was 2.2. The animals ate 41.5 grams/day/cat of R3, compared with 19.0 grams/day/cat of R1. Fifteen cats preferred R3 over R1, while two preferred R1 over R3, and one showed no preference.

EXAMPLE 6

Eighteen adult cats were each offered a first test ration R2, and a second test ration R3 in a two bowl test over a period of two days. R2 was Meow Mix® basal formula kibbles coated with liquid animal digest at 3% by weight plus tetrasodium pyrophosphate at 0.5% by weight. R3 was Meow Mix® basal formula kibbles coated with liquid animal digest at 3% by weight plus tetrasodium pyrophosphate at 0.75% by weight. Of all food consumed over the two days, R3 represented 60.9% of the total, while R2 represented 39.1%, and the ratio of the amount of R3 consumed to the amount of R2 consumed was 1.6. The animals ate 35.1 grams/day/cat of R3, compared with 23.2 grams/day/cat of R1. Fourteen cats preferred R3 over R2, while three preferred R2 over R3, and one showed no preference. The results suggest a positive dose response relationship between the amount of tetrasodium pyrophosphate added to the food and the degree of animal preference for the food.

Table 2 summarizes the results of Examples 5 and 6.

TABLE 2

| Ex. | Ration | most consumed/ least consumed | % of all food consumed | Grams eaten/ day/cat | # of animals with pref. | # of animals without pref. |
| --- | --- | --- | --- | --- | --- | --- |
| 5 | R1 | 2.2 | 31.0 | 19.0 | 2 | 1 |
|   | R3 |     | 69.0 | 41.5 | 15 |   |
| 6 | R2 | 1.6 | 39.1 | 23.2 | 3 | 1 |
|   | R3 |     | 60.9 | 35.1 | 14 |   |

Examples 1 through 6 show that tetrasodium pyrophosphate improves palatability in both dry and liquid formulations of a palatability enhancer. The addition of tetrasodium pyrophosphate to liquid animal digest was found to be more effective as a palatability enhancer than liquid animal digest alone. The addition of tetrasodium pyrophosphate to a dry cat coating produced a more effective palatability enhancer than a typical dry coating alone.

The use of tetrasodium pyrophosphate to enhance the palatability of dry and semi-dry pet foods represents a substantial improvement over current methods. The palatability enhancer is particularly effective for enhancing the palatability to cats of dry and semi-dry cat foods. Further, the use of tetrasodium pyrophosphate represents a relatively low added production cost for pet food manufacturers. In addition, the improved palatability enhancing effect of tetrasodium pyrophosphate survives a range of different application systems and different formulations.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A method for enhancing the palatability of a pet food, said method comprising the step of applying a palatability enhancing composition including tetrasodium pyrophosphate and at least one of an amino acid, an animal by-product, and a microbial protein, to an extruded pet food composition.

2. A method in accordance with claim 1 wherein the palatability enhancing composition is dry and applying the palatability enhancing composition to the extruded pet food comprises dusting the palatability enhancing composition onto the extruded pet food.

3. A method in accordance with claim 1 wherein the extruded pet food is a dry cat food.

4. A method in accordance with claim 1 wherein the extruded pet food is a semi-dry cat food.

5. A method in accordance with claim 1 wherein the palatability enhancing composition is a liquid and applying the palatability enhancing composition to the extruded pet food comprises spraying the palatability enhancing composition onto the extruded pet food.

6. A method in accordance with claim 1 wherein the palatability enhancing composition comprises about 14% to about 20% by weight tetrasodium pyrophosphate.

7. A method in accordance with claim 1 wherein the palatability enhancing composition comprises:
    about 15% to about 25% by weight tetrasodium pyrophosphate;
    about 0. 1% to about 3.0% by weight amino acid;
    about 35% to about 50% by weight animal by-product; and about 35% to about 50% by weight microbial protein.

8. A method in accordance with claim 7 wherein the palatability enhancing composition comprises about 18% by weight tetrasodium pyrophosphate.

9. A method in accordance with claim 7 wherein the palatability enhancing composition comprises about 19.8% by weight tetrasodium pyrophosphate.

10. A method for enhancing the palatability of pet food, said method comprising:
    combining tetrasodium pyrophosphate, animal by-product, and microbial protein in a mixer;
    blending the tetrasodium pyrophosphate, animal by-product and microbial protein to homogeneity to form a palatability enhancing composition; and
    applying the palatability enhancing composition to a pet food.

11. A method in accordance with claim 10 further comprising:
    combining at least one amino acid, a carbohydrate, and a dairy by-product with the tetrasodium pyrophosphate, animal by-product and microbial protein in the mixer; and
    blending the at least one amino acid, carbohydrate, dairy by-product, tetrasodium pyrophosphate, animal by-product and microbial protein to homogeneity.

12. A method in accordance with claim 11 wherein the palatability enhancing composition comprises about 18% to about 25% by weight tetrasodium pyrophosphate.

13. A palatability enhancing composition for extruded pet food, said composition comprising tetrasodium pyrophosphate in an amount effective to enhance palatability and animal by-product.

14. A composition in accordance with claim 13 further comprising microbial protein.

15. A composition in accordance with claim 13 further comprising carbohydrate.

16. A composition in accordance with claim 13 further comprising dairy by-product.

17. A composition in accordance with claim 13 comprising from about 18% to about 25% by weight tetrasodium pyrophosphate.

18. A composition in accordance with claim 13 wherein said composition is dry.

19. A composition in accordance with claim 13 wherein said composition is liquid.

20. A palatability enhancing composition for extruded pet food, said composition comprising tetrasodium pyrophosphate in an amount effective to enhance palatability and a microbial protein.

21. A palatability enhancing composition for extruded pet food, said composition comprising tetrasodium pyrophosphate in an amount effective to enhance palatability and dairy by-product.

22. A palatability enhancing composition for extruded pet food, said composition comprising tetrasodium pyrophosphate in an amount effective to enhance palatability and an amino acid.

23. A palatability enhancing composition for extruded pet food, said composition comprising tetrasodium pyrophosphate in an amount effective to enhance palatability and carbohydrate.

24. A method of improving the palatability of a pet food, said method comprising applying to the pet food a palatability enhancing composition including tetrasodium pyrophosphate, in a quantity sufficient to contribute up to about 3.0% by weight of tetrasodium pyrophosphate to the pet food.

* * * * *